Dec. 18, 1962 S. GINSBERG 3,069,090

VEHICLE TRACTION DEVICE

Filed March 3, 1961 3 Sheets-Sheet 1

INVENTOR.
SAMUEL GINSBERG
BY Leon Edelson
ATTORNEY.

Dec. 18, 1962 S. GINSBERG 3,069,090

VEHICLE TRACTION DEVICE

Filed March 3, 1961 3 Sheets-Sheet 2

INVENTOR.
SAMUEL GINSBERG
BY [signature]
ATTORNEY.

Fig. 10.
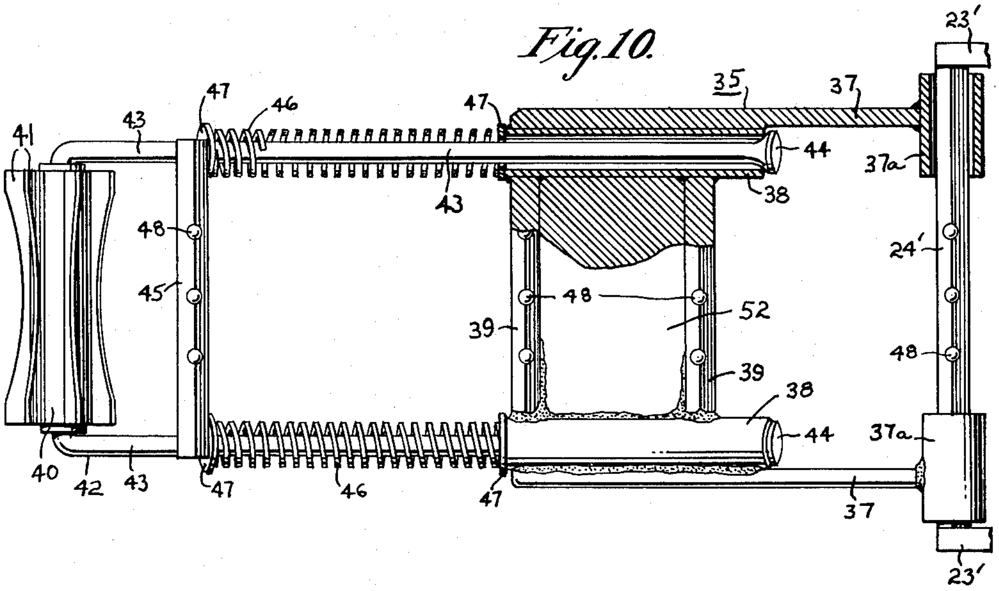
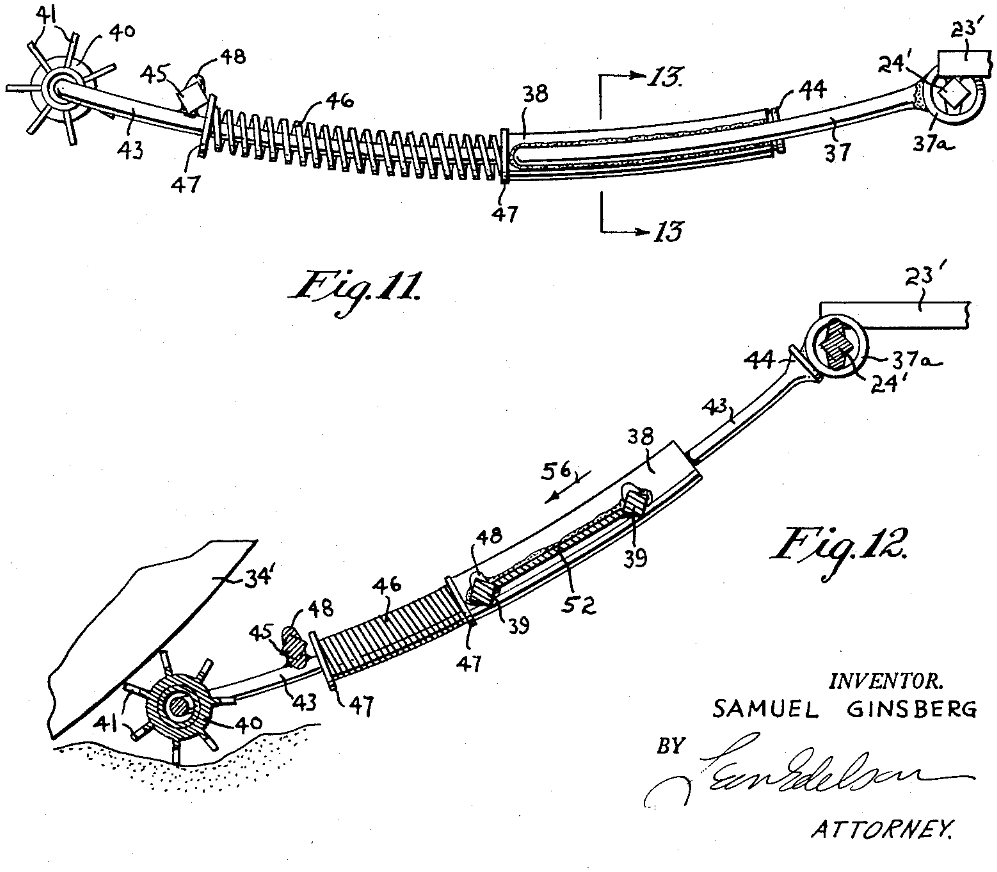
Fig. 11. Fig. 12.
INVENTOR.
SAMUEL GINSBERG
BY [signature]
ATTORNEY.

United States Patent Office 3,069,090

Patented Dec. 18, 1962

1

3,069,090
VEHICLE TRACTION DEVICE

Samuel Ginsberg, 5123 D St., Philadelphia, Pa.

Filed Mar. 3, 1961, Ser. No. 93,238
6 Claims. (Cl. 238—14)

This invention relates generally to means for extricating an automotive vehicle from an immobilized position due to loss of wheel traction as a result of underlying ice and snow. More particularly, this invention relates to auxiliary apparatus which may be conveniently carried in the trunk of an automobile, or other vehicle storage space, and which may be quickly and easily placed in use to positively and rapidly provide ample traction effective to move the vehicle onto a sufficiently firm footing to thereafter render the use of the auxiliary aid no longer necessary.

In the past, auxiliary traction aids for automotive vehicles have been offered to the public, but all such known devices have proved to be ineffective for their intended purpose, so that up to the present time the problem has remained basically unsolved. These prior art devices have usually taken the form of expanded metal mats of a width somewhat in excess of the tire width and of a length equal to perhaps one-half of the tire circumference. During forming, these expanded metal mats usually have the cut edges turned vertically up and down so that theoretically the sharp edges would grip both the snow or ice on the bottom and the tire surface on the top, and thus provide a traction footing for the vehicle wheels. These mat devices almost universally fail to operate in the desired fashion for several reasons. Firstly, the expanded metal generally will not provide the grip as intended. Secondly, the mats are usually made so that the entire structure thereof lies in plane, and it is usually impossible to move the leading edge of the mat into a position such that it would be gripped by the tire, because more often than not the vehicle tires burrows down into the snow or ice and seats itself into a conforming depression. In these cases, even appreciable digging out around the tires will not permit the mats to be properly positioned for operation. It has also been observed that even in those cases where it is possible to sometimes position the expanded metal mats so that they are gripped by the vehicle tires, the usual result which follows is that the mats are drawn beneath the tire and kicked out in the opposite direction while the vehicle remains precisely in its immobilized position. Accordingly, it is a primary object of this invention to provide a novel auxiliary traction aid for automotive vehicles capable of extricating the same from a position of immobilization as a consequence of loss of traction due to underlying snow or ice.

Another object of this invention is to provide a novel auxiliary traction aid for automotive vehicles as aforesaid which is operative even in those cases where the vehicle wheel has burrowed downward for a considerable distance into the underlying snow or ice so that the wheels are locked in a rut of their own making.

Still another object of this invention is to provide a novel auxiliary traction device for automotive vehicles which is positionally self-adjusting in use, which firmly locks itself in position relative to both the vehicle wheels and the snow or ice surface so that it cannot be ejected due to spinning of the vehicle wheels, and which eliminates the necessity for carrying with the vehicle snow and ice digging apparatus such as a spade or shovel.

A further object of this invention is to provide a novel auxiliary traction device for use with automotive vehicles which, when the need arises, may be operated without requiring personnel to crawl under the vehicle to install the device, but which may be readily placed in use from behind or from the side of the vehicle.

2

The foregoing and other objects of this invention will become apparent from a reading of the following specification in conjunction with an examination of the appended drawings, wherein.

Figure 2:
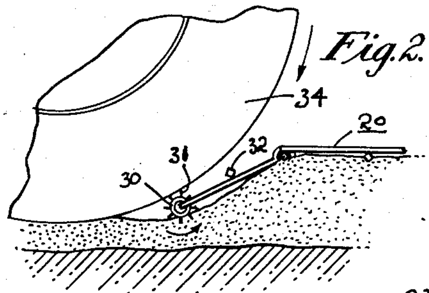
FIGURE 2 is an enlarged fragmentary showing of an automobile wheel seated in a depression in snow or ice and showing she swinging end section of the traction device in position relative to the wheel.
Figures 3, 4:
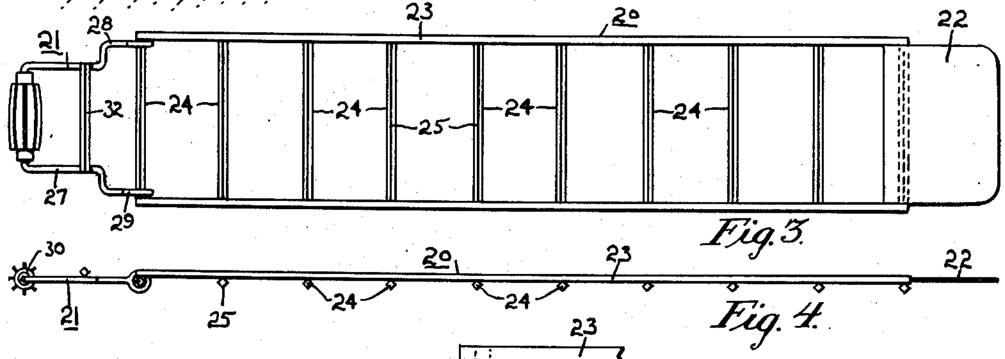
FIGURE 3 is a top plan view of the vehicle traction device according to the invention and showing the major aspects thereof together with the overall organization of the device.
FIGURE 4 is a side view of the novel traction device according to the invention and as illustrated in FIGURE 3.
Figure 8:
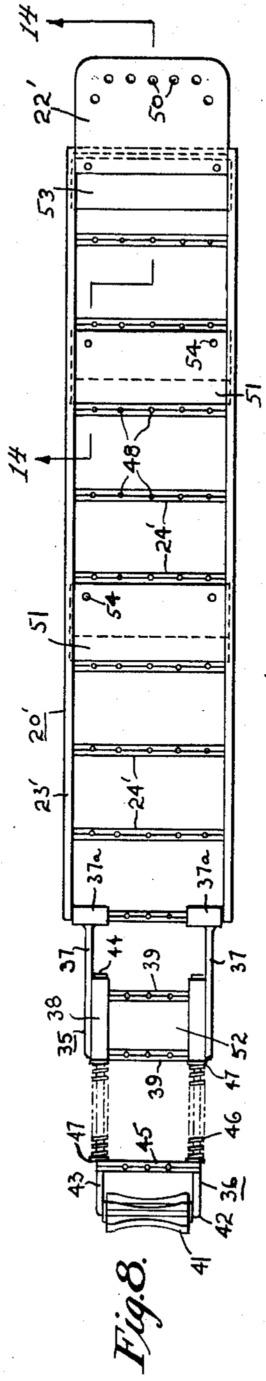
Figure 9:
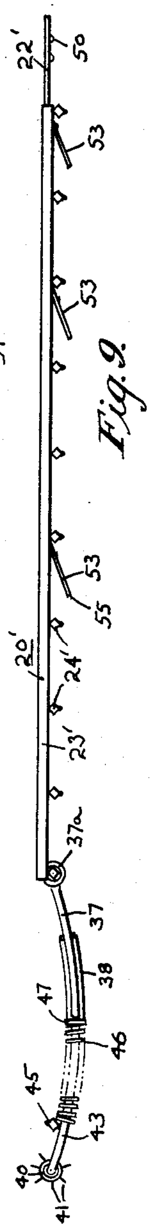
Figure 14:
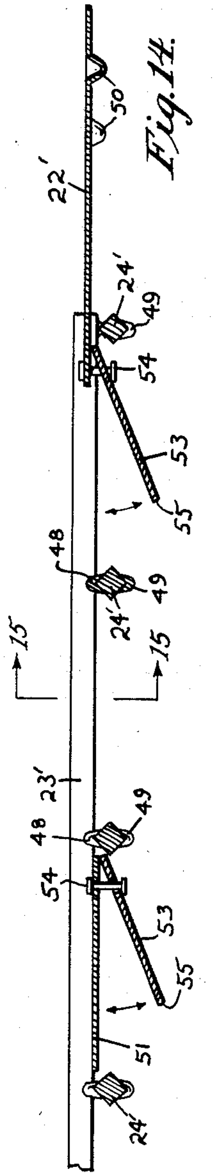
Figure 15:
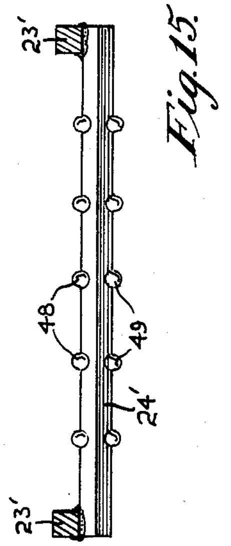
Figure 13:
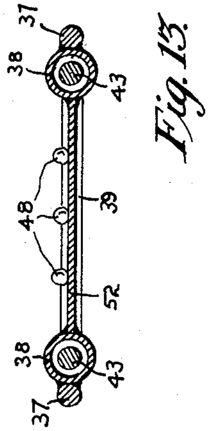

FIGURES 8 through 15 illustrate a modified form of the vehicle traction device according to the invention, FIGURES 8 and 9 showing plan and side elevational views respectively similar to FIGURES 3 and 4; FIGURES 10, 11 and 12 showing enlarged plan and side views of the swingable section of the apparatus and corresponding generally to the showings of FIGURES 5, 6 and 2 of the first embodiment; FIGURES 13 and 14 are sectional views of the apparatus as would be seen when viewed respectively along the lines 13—13 of FIGURE 11 and 14—14 of FIGURE 9; and FIGURE 15 is a sectional view as would be seen when viewed along the lines 15—15 of FIG. 14.

In the several figures, like elements are denoted by like reference characters.

Figure 5:
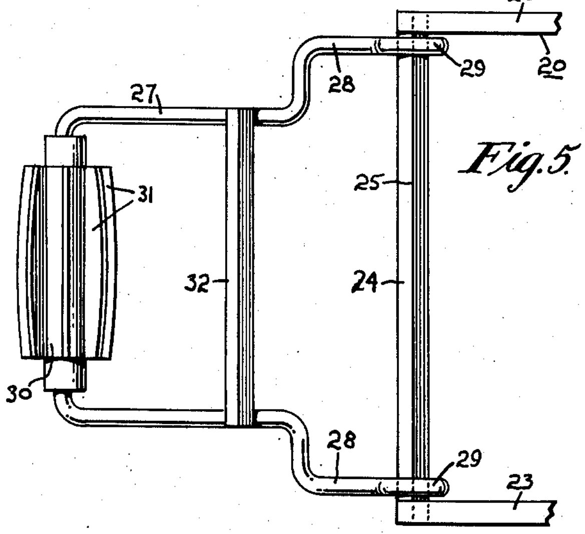
FIGURE 5 is an enlarged plan view of the left-hand end of the traction device as seen in FIGURE 3 illustrating more clearly details of the construction.
Figure 6:
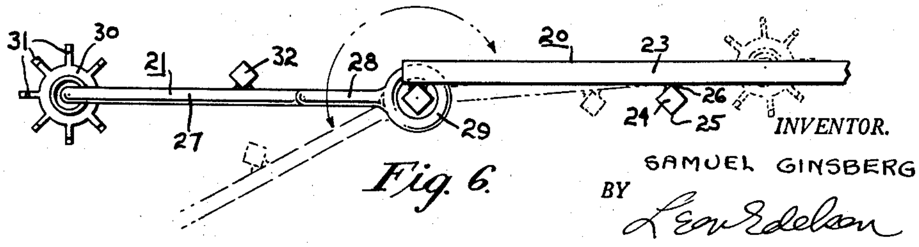
FIGURE 6 is an enlarged elevation of the left-hand end of the traction device as illustrated in FIGURE 4, with the swinging action of the auxiliary end section indicated by the phantom line displaced position.

Turning now to the figures, and firstly to FIGURES 1 through 7 illustrating one form of the vehicle traction device according to the invention, it is observed that the traction device includes a ladder-like main frame 20, a swingable end section 21 rotatably secured to one end of the main frame 20, and a broad spade-like plate section 22 rigidly secured to the opposite end of the main frame 20, as for example by welding. The main frame 20 comprises a pair of substantially parallel rigid rectangular side rails 23 and a plurality of parallel rigid rectangular cross bars 24 fixedly secured to and bridging between the side rails 23, the cross bars 24 being spaced apart from one end to the other of the side rails. Each of the cross bars 24 of rectangular cross section is oriented so that diagonally opposite corners of the cross bars are disposed in parallel planes substantially perpendicular to the plane passing through the side rails 23. This orientation places the cross bar corner edges 25 in the best position for simultaneously gripping the snow or ice surfaces upon which the traction device is disposed and the tire tread when the vehicle is running up onto the main frame 20. As best seen in the showing of FIGURE 6, the cross bars 24 are secured to the side rails 23 by welds 26.

The swingable end section 21 consists of a U-shaped member 27, the arm terminal portion 28 of which are outwardly offset and reverse turned about the end cross bar 24 of the main frame 20 into a pair of eyes 29 which permit the swinging movements of the end section 21 relative to the main frame 20. Rotatably disposed upon the base section of the U-shaped member 27 is a cylindrical gear-like structure 30 formed with a plurality of longitudinally extending and radially projecting convex vanes or fins 31. Bridging between and welded to the side arms of the U-shaped member 27 and on the top surface thereof is a cross bar 32 similar to the cross bars 24 of the main frame 20, with the exception that the cross bar 32 is welded to the top of the U-shaped member 27 whereas the cross bars 24 of the main frame 20 are welded to the bottom sides of the side rails 23.

Figure 7:
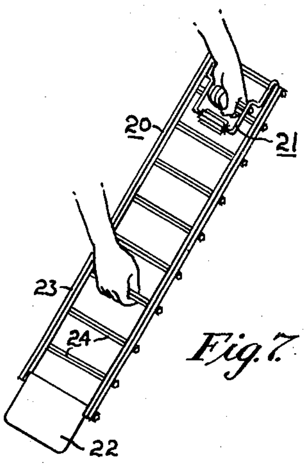
FIGURE 7 is a perspective view of the traction device according to the invention illustrating the use thereof as a trenching or shovelling tool.

From the showing of FIGURE 7, it will be appreciated that the plate section 22 enables the entire traction device to be used in the manner of a spade or shovel for purposes of digging out around a vehicle wheel to permit proper positioning of the traction device, and is particularly useful in those cases wherein the wheel has burrowed downward into the snow or ice and created a pocket which closely conforms to the shape of the lower portion of the vehicle tire. This spade-like plate section 22, of course, thus obviates the necessity for carting around a separate spade or shovel. As clearly seen in the showing of FIGURE 7, the cross bars 24 provide convenient hand holds for easy manipulation of the device when used as a spade, and also provide convenient points for the application of foot or leg pressure if such is necessary or desirable.

Figure 1:
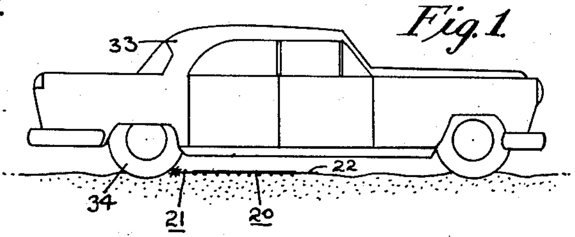
FIGURE 1 is a side elevational view of an automobile resting on a snow or ice covered surface and illustrating the vehicle traction device according to the invention placed in position against the forward part of the rear wheel so as to enable the vehicle to move forward onto a firmer footing.

As shown in FIGURE 1, the traction device is layed horizontally upon the snow or ice on which an automobile 33 is immobilized with the cylindrical gear 30 of the swinging section 21 pushed backward into abutment with the front of the rear tire 34. The cross bars 24 of the main frame 20 engage the underlying snow or ice surface to prevent shifting of the traction device as the wheel 34 of the automobile rides thereonto. In the illustration of FIGURE 1, the automobile 33 would, of course, be placed in a forward drive condition so that as the tire 34 begins to rotate, the treads thereof engage the vanes 31 of the cylindrical gear 30 and tend to draw the entire device under the tire. However, as soon as the weight of the car bears upon the device, the vanes 31 of the gear 30 and the lower edges 25 of the cross bars 24 are pressed forcibly downward into the snow or ice surface and prevent the traction device from being spun beneath the wheel and thrown out behind the car. The firm base thus afforded by the traction device enables the car 33, the tire 34 of which has grippingly engaged the vanes of the gear 30, to ride forward onto the main frame 20 and thus be extricated from its immobilized position. The cross bar 32 on the swing section 21 is, of course, to provide a good grip for the tire tread as the latter moves upward over and beyond the cylindrical gear 30 on its way to the main frame 20.

FIGURE 2 illustrates the very commonly occurring condition where the tire 34 has burrowed downward into the snow or ice surface and hence requires a great deal more traction to extricate itself. As shown in FIGURE 2, the snow or ice in front of the tire 34 has been dug or chopped away by means of the spade plate section 22 to permit the cylindrical gear 30 to be pushed downward and engage the snow or ice surface and the tire 34 tread proximate the bottom of the tire. Thus, the vehicle need only be moved forward to effect positive engagement of the tire 34 with the cylindrical gear 30 and does not require sufficient traction to raise the vehicle into engagement with the cylindrical gear 30. Obviously, if sufficient traction were available to raise the tire to the surface of the snow or ice pocket there would be also sufficient traction to completely extricate the vehicle. The provision of the swingable end section 21 is therefore of material importance in providing the ability of the device to extricate the immobilized vehicle, and the swinging action of this end section permits the same to assume whatever angle relative to the main frame 20 is necessary in order to be projectable downward along a slope to the bottom of the tire 34 while at the same time allowing the main frame 20 to remain in a flat position in gripping engagement with the underlaying snow or ice surface. Of course, in actual practice, two such traction devices will be used, one for each of the drive wheels. Additionally, it may be more convenient under certain circumstances to apply the traction devices to the rear end of the tire 34 and to move the vehicle 33 in reverse. Which ever direction of travel is most convenient, it will be readily appreciated that because of the rigid structure of the main frame 20 and the U-shaped member 27 of the swingable section 21 that the entire device may be easily and conveniently positioned against the tire tread by a push-in action which does not require personnel to crawl under the vehicle.

Understanding now the basic structural and operational features of the vehicle traction device according to the invention, attention should be directed to the showings of FIGURES 8 through 15 which illustrate the embodiment of certain modifications into the basic structure shown in FIGURES 1 to 7. In overall aspect, the modified embodiment of FIGURES 8 through 15 is similar to that form of the invention already described in that the modified structure also includes a ladder-like main frame 20′ formed from a pair of parallel longitudinally extending side rails 23′ rigidly secured together by cross bars 24′ and having a spade-like plate section 22′ affixed to the right-hand end of the main frame 20′. Moreover, the modified form also includes a swingable end section provided for the same purpose as the end section 21 shown for example in FIGURES 3 through 6. However, the end section of the modified form of the invention differs from the end section 21 in that it includes a swingable section 35 and a shiftable section 36. The swingable section 35 is formed from a pair of upwardly curved side arms 37 which terminate at the main frame 20′ in a pair of tubular pivot sleeves 37*a* disposed about the end cross bar 24′ of the main frame 20′. The opposite ends of the curved side arms 37 are each secured to a curved tubular shaftway sleeve 38 extending substantially parallel to the curved side arms 37, and the side arms 37 and shaftway sleeves 38 are secured in an integral rigid structure by means of the parallel spaced-apart cross bars 39 extending therebetween and oriented substantially parallel to the main frame cross bars 24′. Coupled to the swingable section 35 for longitudinal shifting movement relative thereto is the shiftable end section 36 formed by a U-shaped member 42 having a pair of curved side arms 43 which extend rearwardly through the tubular shaftway sleeves 38 of the swingable section 35 and terminate in a pair of flanged ends 44 which prevent separation of the U-shaped member 42 from the shaftway sleeves 38 of the swingable section 35.

Revolubly carried by the base leg of the U-shaped member 42 is a cylindrical gear 40 provided with a plurality of peripherally spaced axially extending and radially projecting concave vanes or fins 41. While the convex vanes 31 shown in FIGURES 3 and 5 are generally quite effective, it has been found that the concave vanes 41 shown in FIGURE 10 have somewhat less tendency to side slip when working against a narrow tire. Bridging between and rigidly secured to the side arms 43 of the U-shaped member 42 somewhat removed from the cylindrical gear 40 is a cross bar 45. Disposed about each of the side arms 43 of the U-shaped member 42 between the cross bar 45 and the proximate ends of the tubular shaftway sleeves 38 of the swingable section 35 are compression springs 46 which bias the shiftable section 36 into a maximum extended position away from the swingable section 35 until the flanged ends 44 of the side arms 43 preclude further outward shifting of the section 36. Stop washers 47 on the side arms 43 provide good end bearings for the compression springs 46 and prevent undue distortion thereof or any tendency of the springs to jam into the ends of the tubular shaftway sleeves 38. To provide increased tire tread and ice or snow gripping power, the cross bars 24′ and 45 are provided with a plurality of upwardly extending top projections 48 and downwardly extending bottom projections 49, whereas the cross bars 39 are provided only with the upwardly extending top projections 48. Additionally, if desired, the undersurface of the spade-like plate section 22′ may be provided with downwardly extending plate projections 50 as an aid in preventing the possibility of the traction device being thrown by the vehicle as the latter rolls off the end of the plate section 22′.

In those instances in which the traction device is employed to extricate the immobilized vehicle from relatively soft snow, there may exist a tendency for the entire traction device to be pushed down into the underlying soft snow which would in measure impair the efficiency thereof. To avoid this press-down possibility, the bearing surface of the device can be materially increased by providing the bearing plates 51 welded to the main frame 20′ in the manner best illustrated in the showing of FIGURE 8. A similar bearing plate 52 may be welded between the cross bars 39 of the swingable section 35. Finally, a plurality of capitive grab scoops 53 may be secured by the nuts and bolts 54, or other captive means, in flat parallel relationship beneath the bearing plates 51. On a hard surface, the grab scoops 53 will flat fold up against the bearing plates 51 and thus interpose no hindrance to the proper operation of the traction device.

In soft snow, where the anchoring effect of the bottom projections 49 is of relatively little value, the grab scoops 53 prevent the traction device from being kicked out from beneath the vehicle wheel by virtue of the fact that as soon as longitudinal shifting tends to occur, the leading edges 55 of the grab scoops 53 are caught by the snow and forced downward into a snow grabbing position, as may be best seen in the showing of FIGURE 14. By virtue of the fact that the nuts and bolts 54 retain the trailing edges of the grab scoops 53 upward proximate the main frame, the attempted longitudinal shifting of the traction device wedges snow between the upper surface of the grab scoops 53 and the immediately above lying undersurface of the bearing plates 51 and therefore strongly opposes such shifting motion of the traction device to maintain the latter in relatively fixed position and enable the vehicle to extricate itself.

The important feature of the spring loaded shiftable section 36 resides in the fact that disengagement between the tire tread and the vaned cylinder 40 cannot occur under any circumstance and positive engagement is always maintained. This action comes about as a result of exerting longitudinal force on the main frame 20′ with the vaned cylinder 40 against the tire tread so as to compress the springs 46 by shifting the section 36 longitudinally toward the main frame 20′ through the tubular shaftway sleeves 38 before placing the main frame 20′ flatwise downward upon the underlying snow or ice surface. Thus, in the event that rotation of the vehicle wheels tend to cause some displacement thereof away from the vaned cylinder 40, the compression springs 46 firmly push the cylinder 40 against the tire tread as for example illustrated by the arrow 56 in the showing of FIGURE 12, so that the tires 34′ cannot run away from the vaned cylinder 40. The composite arcuate form of the swingable section 35 and shiftable section 36 allows for engagement thereof with the tire tread over a larger part of the tread periphery and hence increases the pull-out traction surface.

Having now described my invention in connection with particularly illustrated embodiments thereof, it will be apparent that variations and modifications may occur from time to time to those persons normally skilled in the art without departing from the essential scope or spirit of the invention, and, accordingly, it is intended to claim the same broadly as well as specifically as indicated by the appended claims.

What is claimed as new and useful is:

1. A vehicle traction device adapted to provide a traction base for a drive wheel of an automotive vehicle, comprising in combination, a rigid elongated rectangular frame including a pair of spaced-apart substantially parallel side rails having a plurality of rigid members of substantially rectangular cross-section bridging therebetween and rigidly secured thereto, said bridging members being oriented substantially orthogonally to the lengthwise extent of the side rails and being spaced apart from one end to the other of said side rails to form a rigid ladder-like structure with the bridging members corresponding to the ladder rungs, the bridging members being also each oriented to place diagonal corners of their rectangular cross-section in planes substantially perpendicular to the plane of the ladder frame with at least one of said diagonal corners of each member projecting laterally beyond the plane of the side rails, and an auxiliary section coupled to one end of said ladder frame for swinging movement relative thereto about an axis parallel to one of said bridging members, said auxiliary section carrying a gripper device comprising a revoluble cylinder having a plurality of rigid projections extending radially outward from and positioned about the outside surface thereof, said cylinder being adapted to be positioned at the junction between the vehicle wheel and the surface upon which the wheel sits and being effective to grip the said surface and be gripped by said wheel.

2. A vehicle traction device adapted to provide a tractive surface for a drive wheel of an automotive vehicle, comprising in combination, a ladder frame structure including a pair of side rails and a plurality of cross-rungs secured thereto, first and second means associated with said cross-rungs effective respectively for grippingly engaging a surface upon which the ladder frame may be substantially flatwise disposed and for providing a traction base for a wheel of an automotive vehicle, and an auxiliary section coupled to one end of said ladder frame for shifting movement relative thereto, said auxiliary section carrying an anti-slip device adapted to be positioned at the junction between the vehicle wheel and the surface upon which the wheel sits, whereby the vehicle wheel is enabled to grip the anti-slip device and propel itself onto the traction base second means of the ladder frame and thereby extricate the vehicle, said auxiliary section comprising a swingable portion and a terminating portion, said swingable portion being coupled to one end of said ladder frame for swinging movement relative thereto about an axis parallel to one of said cross-rungs, and said terminating portion being coupled to said swingable portion for shifting movement relative to the latter toward and away from the swinging axis thereof, said terminating portion carrying said anti-slip device and including means for biasing the terminating portion away from the said swingable portion swinging axis.

3. A vehicle traction device adapted to provide a tractive surface for a drive wheel of an automotive vehicle, comprising in combination, an elongated frame having a pair of spaced apart side rails with a plurality of members bridging therebetween and fixedly secured thereto, said bridging members being spaced apart from one another long the length of the frame side rails, means associated with said frame effective to grippingly engage a surface upon which the frame may be substantially flatwise disposed, means associated with said bridging members effective to provide a traction base for a wheel of an automotive vehicle, and a swing section coupled to one end of said frame and shiftable relative to the plane thereof, said swing section being of short length relative to the length of the frame and including at the free end thereof a revoluble cylinder having a plurality of rigid projections extending radially outward from and positioned about the outside surface thereof, said cylinder being adapted to be wedged between the vehicle wheel and the surface upon which the wheel sits, whereby the vehicle wheel is enabled to grip the cylinder and propel itself onto the traction base of the frame and thereby extricate the vehicle.

4. A vehicle traction device adapted to provide a tractive surface for a drive wheel of an automotive vehicle, comprising in combination, an elongated frame having a pair of spaced apart rigid side rails with a plurality of rigid members bridging therebetween and rigidly secured thereto, said bridging members being spaced apart from one another along the length of the frame side rails, means associated with said frame effective to grippingly engage a surface upon which the frame may be substantially flatwise disposed, means associated with said bridging members effective to provide a traction base for a wheel of an automotive vehicle, and a rigid swing section pivotally coupled to one end of said frame and swingable in a plane transverse to the lengthwise extent of the said bridging members, said swing section being of short length relative to the length of the frame and including at the free end thereof a revoluble cylinder having a plurality of rigid fins extending radially outward from the outside cylindrical surface thereof and lengthwise parallel to the cylindrical axis which extends along a line substantially parallel to the shortest distance between the said frame side rails, said cylinder being adapted for wedging between the vehicle wheel and the surface upon which the wheel sits, whereby the vehicle wheel is enabled to grip the fins of the cylinder and propel itself onto the traction base of the frame and thereby extricate the vehicle.

5. A vehicle traction device adapted to provide a tractive surface for a drive wheel of an automotive vehicle, comprising in combination, an elongated frame including means effective to grippingly engage a surface upon which the frame may be substantially flatwise disposed and means effective to provide a traction base for a wheel of an automotive vehicle, and a revoluble cylinder coupled to one end of said frame and adapted to be wedged between the vehicle wheel and the surface upon which the wheel sits, said cylinder having a plurality of rigid projections extending radially outward from and positioned about the outside surface thereof, whereby the vehicle wheel is enabled to grip the rigid projections of the cylinder and propel itself onto the traction base of the frame and thereby extricate the vehicle.

6. The traction device according to claim 5 wherein the rigid projections extending radially outward from the surface of the cylinder are fins which extend lengthwise parallel to the cylindrical axis.

References Cited in the file of this patent

UNITED STATES PATENTS

| | | |
|---|---|---|
| 1,344,238 | Lavallee | June 22, 1920 |
| 1,389,400 | Tufts | Aug. 30, 1921 |
| 1,400,478 | Deschamps | Dec. 13, 1921 |
| 2,248,537 | Libbey | July 8, 1941 |